United States Patent [19]

Imai et al.

[11] Patent Number: 5,465,336
[45] Date of Patent: Nov. 7, 1995

[54] FETCH AND STORE BUFFER THAT ENABLES OUT-OF-ORDER EXECUTION OF MEMORY INSTRUCTIONS IN A DATA PROCESSING SYSTEM

[75] Inventors: Benjamin T. Imai, Round Rock; Hung Q. Le; Dung Q. Nguyen, both of Austin, all of Tex.

[73] Assignee: International Business Machines Corporation, Armonk, N.Y.

[21] Appl. No.: 269,868

[22] Filed: Jun. 30, 1994

[51] Int. Cl.[6] .................................................. G06F 9/38
[52] U.S. Cl. .................... 395/375; 395/494; 395/421.04; 395/421.03
[58] Field of Search ................................ 395/250, 375, 395/725, 800, 425

[56] References Cited

U.S. PATENT DOCUMENTS

| | | | |
|---|---|---|---|
| 4,507,728 | 3/1985 | Sakamoto et al. | 395/375 |
| 4,638,429 | 1/1987 | Watabe et al. | 395/375 |
| 4,722,049 | 1/1988 | Lahti | 395/375 |
| 4,773,041 | 9/1988 | Hassler et al. | 395/400 |
| 4,916,652 | 4/1990 | Schwarz et al. | 364/748 |
| 4,942,525 | 7/1990 | Shintani et al. | 395/375 |
| 4,991,090 | 2/1991 | Emma et al. | 395/575 |
| 4,992,938 | 2/1991 | Cocke et al. | 395/375 |
| 5,073,855 | 12/1991 | Staplin et al. | 395/375 |
| 5,075,840 | 12/1991 | Grohoski et al. | 395/800 |
| 5,125,083 | 6/1992 | Fite et al. | 395/375 |

(List continued on next page.)

OTHER PUBLICATIONS

Johnson, "Superscalar Microprocessor Design", Prentice–Hall 1991 pp. 10–12, 19–22, 98.

Diefendorff et al, "Organizastion of the Motorola 88110 Superscalar RISC Microprocessor", IEEE Apr. 1992, pp. 40–63.

Pyt Hsu, *Bypass–Load Instruction*, IBM Technical Disclosure Bulletin, vol. 31 No. 10, Mar. 1989, pp. 276–277.

P. G. Emma, *Enhanced Overlap by Early EOP Reprioritization of Stores*, IBM Technical Disclosure Bulletin, vol. 32 No. 8A, Jan. 1990, pp. 373–376.

Muhich, et al, *Memory Arbitration with out of Order Execution in Conjunction with a RISC System*, IBM Technical Disclosure Bulletin, vol. 35, No. 4A, Sep. 1992, pp. 62–64.

Hovis, et al, *Main Storage Early fetch Return*, IBM Technical Disclosure Bulletin, vol. 35, No. 7, Dec. 1992, pp. 428–430.

Ekanadham, et al, *Using Level of Conditionality to Monitor Operand Store Compare*, IBM Technical Disclosure Bulletin, vol. 36, No. 1, Jan. 1993, pp. 428–431.

Ekanadham, et al, *Multisequencing a Single Instruction Stream Operations of the Store/Fetch Look-Aside*, IBM Technical Disclosure Bulletin, vol. 36, No. 5, May 1993, pp. 125–128.

*Primary Examiner*—Parshotam S. Lall
*Assistant Examiner*—Viet Vu
*Attorney, Agent, or Firm*—Mark E. McBurney; Craig J. Yudell; Andrew J. Dillon

[57] ABSTRACT

A method and device for handling fetch and store requests in a data processing system is provided. A fetch and store buffer comprises a store queue, a fetch queue, a register, a comparator, and a controller. The store queue and the fetch queue receive requests from one or more execution units. When the fetch queue receives a fetch request from an execution unit, it sets a mark in a field associated with the request indicating the store queue entries present at the time the fetch request is entered, and further, removing a mark from the field when the associated store queue entry is drained. The controller gates a copy of the fetch request in the fetch queue into the memory unit address register and to the memory unit, when the memory unit is ready to accept a request. The comparator determines if there is a dependency between the gated request in the memory unit address register and any store queue entries marked in the gated request's field. When a dependency is determined by the comparator, the controller drains the store queue entries marked in the pending fetch request's field from the store queue prior to draining the fetch queue entries.

2 Claims, 3 Drawing Sheets

U.S. PATENT DOCUMENTS

| | | | |
|---|---|---|---|
| 5,133,077 | 7/1992 | Karne et al. | 395/800 |
| 5,151,981 | 8/1992 | Westcott et al. | 395/375 |
| 5,185,871 | 2/1993 | Frey et al. | 395/375 |
| 5,224,214 | 6/1993 | Rosich | 395/250 |
| 5,226,126 | 7/1993 | McFarland et al. | 395/375 |
| 5,261,071 | 11/1993 | Lyon | 395/425 |
| 5,301,331 | 4/1994 | Ueno et al. | 395/725 |
| 5,345,569 | 9/1994 | Tran | 395/375 |
| 5,363,495 | 11/1994 | Fry et al. | 395/375 |

FETCH AND STORE BUFFER THAT ENABLES OUT-OF-ORDER EXECUTION OF MEMORY INSTRUCTIONS IN A DATA PROCESSING SYSTEM

BACKGROUND OF THE INVENTION

1. Technical Field

The present invention relates in general to a fetch and store buffer scheme and, in particular, to a fetch and store buffer scheme which supports out of order execution in a superscalar processor design.

2. Description of the Related Art

The particular function obtained by any computer is dependant on the instruction sequence of its computer program. Thus, a computer program is expected to handle its instructions, and their associated fetches and stores to memory, in the sequence indicated by the instruction sequence. Otherwise, memory incoherence may result. Consequently, conventional CPUs maintain the instruction sequence of fetches and stores during program execution to provide the program results which the program designer expects of the program.

To avoid violating the instruction sequence as programmed by the computer programmer, prior computer systems maintain the instruction sequence by not starting the execution of the next instruction in a program until the execution was complete for the adjacent prior instruction in the program sequence. Thus, a memory fetch or a store for a next instruction in the program sequence was delayed until execution was completed for the prior instruction in the program sequence. All memory fetches and stores within any instruction were executed in the order specified by the architecture of the respective instruction.

Clearly, system performance would be enhanced if store and fetch requests are issued to storage as soon as the request is in a proper form to be issued, rather than being delayed until their proper position in the program sequence. However, because particular store and fetch requests will be generated faster than others, such a scheme will create out of sequence execution.

This problem becomes more pronounced in a superscalar environment. When two or more execution units are accessing a memory unit, the likelihood of copending dependent store and fetch requests substantially increases. In order to implement such a scheme without introducing hazardous memory operations, it would be desirable to have a fetch and store buffer scheme which supports such out of order execution while maintaining memory coherence as expected by the instruction sequence. Lastly, the problem also applies in a multiprocessor system when two or more processors are accessing memory.

SUMMARY OF THE INVENTION

According to the present invention, a method and device for handling fetch and store requests in a data processing system is provided. A fetch and store buffer comprises a store queue, a fetch queue, a register, a comparator, and a controller. The store queue and the fetch queue receive requests from one or more execution units. When the fetch queue receives a fetch request from an execution unit, it sets a mark in a field associated with the request indicating the store queue entries present at the time the fetch request is entered, and further, removing a mark from the field when the associated store queue entry is drained. When the memory unit is ready to accept a request, the controller gates a copy of the fetch request in the fetch queue into the memory unit address register and to the memory unit. The comparator determines if there is a dependency between the gated request in the memory unit address register and any store queue entries marked in the gated request's field. When a dependency is determined by the comparator, the controller drains the store queue entries marked in the pending fetch request's field from the store queue prior to draining the fetch queue entries.

Additional features of the present invention include wherein the controller will set a tag associated with a request if an interrupt associated with the request is detected, and further, if an interrupt tagged request is a store, the controller will halt execution of all requests until the interrupt is acknowledged by instruction sequencing logic, and still further, if an interrupt tagged request is a fetch, the controller will drain all store queue entries marked in the interrupt tagged request's field to the memory unit to be executed, while halting the draining of the fetch queue until the interrupt is acknowledged by the instruction sequencing logic.

Additional features include a pending data address register having the address of the pending request, a data address register having the address of an interrupt tagged request, a pending data storage interrupt status register having status information about a pending interrupt tagged request, and a data storage interrupt status register having status information about a previous interrupt tagged request.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
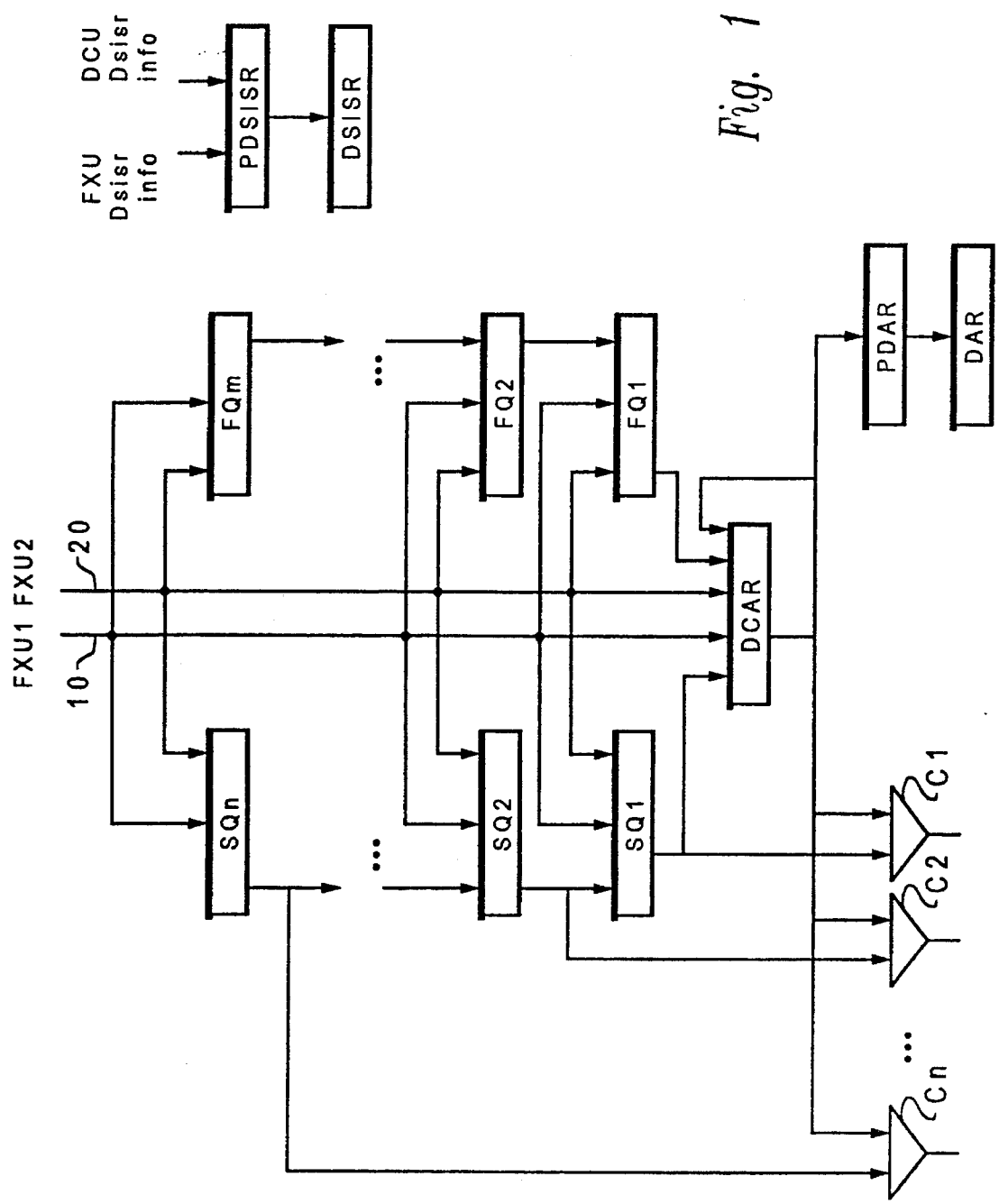
FIG. 1 depicts a block diagram of a buffer in accordance with a preferred embodiment of the present invention

FIG. 1 depicts a block diagram of a fetch and store buffer as used in a data processing system according to the present invention. Two execution units, FXU1 and FXU2, are connected to the buffer by bus lines 10 and 20. These two execution units are capable of generating storage requests for a memory unit or storage media, concurrently. It should be understood that although only two execution units are shown connected to the buffer, additional bus lines could be designed into the buffer to connect additional execution units according to the present invention. In such a case, each execution unit could issue a request at the same time, resulting in multiple storage requests being received by the buffer simultaneously.

The buffer is comprised of two sets of independent registers: one set called the fetch queue and the other called the store queue. The registers that make up the store queue are SQ1-SQn. The registers that make up the fetch queue are FQ1-FQm. Both queues shown in this embodiment operate as FIFO (first in, first out) buffers. However, the only requirement is that the store requests must be sent in order with respect to other stores but the fetch requests may be sent out of order.

The fetch queue (FQ) is used to queue up fetch requests when the execution unit overruns the memory unit (requests are generated faster than the storage can accept). It is also used to queue up requests that are interlocked to previous stores (as used in this specification, an interlocked fetch request is one which is addressed to the same memory location as a store request previously received by the buffer of the present invention). Each entry in the FQ consists of:

| EA | SQmark | IID | BR | CNTL | V | SP | FI |

EA: The address.

SQmark: this field has bits marked indicating entries of the Store Queue at the time an entry is gated into the Fetch queue. This field is used to indicate which store queue entries were present in the buffer at the time this fetch queue entry arrived. It is set when the fetch address is gated in to the Fetch queue and updated each time an entry is removed from the Store queue.

IID: Fetch identifier. This field is used by the instruction sequence table (which is beyond the scope of this specification) to keep track of the fetch instructions.

BR: The branch tag bits to identify which branch path this fetch belongs to. It is used for speculative execution.

CNTL: Control signals associated with each fetch. This field tells the memory unit what to do with the request. Some examples are: load word, load double word, what unit will receive the data, register pointer for register renaming, etc.

V: Entry is valid.

SP: pend bit to indicate that this entry has been read out and it was found that it interlocks to a previous store request in the store queue. A fetch entry with an active SP bit must wait for all its SQmark to clear up before proceeding.

FI: FXU detected interrupt associated with this fetch.

The store queue (SQ) is used to queue up store requests. Store requests are kept in this queue so that fetch requests can be made ahead of and therefore out of order from stores. Each entry in the SQ consists of:

| EA | IID | BR | RS | CNTL | FI | V |

EA: The address.

IID: Store identifier. This field is used by the instruction sequencing table to keep track of the store instruction.

BR: The branch tag bits to identify which branch path this store belongs to (it is used for speculative execution).

RS: The register file location that contains the store data.

CNTL: Control signals associated with each store. This field tells the memory unit what to do with the request.

FI: FXU detected interrupt associated with this store.

V: Entry is valid.

When an execution unit issues a store or fetch request to a memory unit, such as a cache, such a request is sent to the fetch and store buffer of the present invention. As can be seen in FIG. 1, FXU1 and FXU2 are directly connected to the Data Cache Address Register (DCAR). The DCAR contains the address of the request being made to the memory unit. In the preferred embodiment, a one port cache is used; thus, it can only accept one request at a time. However, a multiport memory unit can be supported by the fetch and store queue of the present invention by adding more read ports to the buffer and more bus lines to the memory unit. From the FQ or SQ the command is sent to a memory unit to be executed. Simultaneously the command is saved in DCAR.

If this request is a store request, the request is loaded into the store queue at SQ1, As additional storage requests are received during the same cycle, they are stacked into the next available register within the storage queue. Then, in subsequent cycles, the oldest store request within the store queue (i.e. SQ1) will be transferred to DCAR and the memory unit for execution. The remaining store requests in the stack will drop down to the next lowest register in the stack.

Store requests are generated by the FXUs as soon as the data needed for the address generation are available, and then are stored in the store queue. Store requests are kept in the store queue until all prior instructions to this store have architecturally completed as viewed by the program. This ensures that the memory state in the memory unit is changed in the order as perceived by the computer program.

When this store instruction is the next instruction to be completed, or the processor forces the store to be sent to the memory unit, the store request is both gated into the DCAR and sent to the memory unit along with the store data which has been held in separate general purpose registers as pointed to in the RS field of the store request. Then, the stack of store requests in the store queue drop down into the next lowest register to fill the vacated register. As used in this specification, this process of gating a request to DCAR, sending it to the memory unit, and dropping the queue stack down a predetermined number of registers is known as "draining" an entry from the queue, wherein a queue may be either a store queue or a fetch queue. The remaining store requests continue to be drained out of the store queue in a similar manner until the entire store queue is emptied.

Fetch requests from each execution unit are gated into the fetch queue. Each time a fetch request is gated into the fetch queue, bits in an "SQmark" field of the fetch request are marked to indicate which store queue entries are present at the time the fetch request was entered. In other words, marking the SQmark field indicates which store queue entries are older than the received fetch request.

The fetch requests are allowed to proceed to the memory unit ahead of most store requests contained in the store queue, even if the instruction sequence places the store requests ahead of the fetch requests. The fetch queue and store queue allow the address generation of load and store instructions to proceed as soon as all the resources needed to generate the address are available. Addresses are then queued up while a busy cache is executing the previous instruction, rather than holding off on the dispatch. This enhances performance by allowing more instruction dispatch.

The out of sequence execution procedure for the buffer includes a verification mechanism to prevent hazardous fetch requests from being returned to the execution unit.

First, a fetch request in the fetch queue is gated into the DCAR at a point when the memory unit is ready to accept the request. This gating of the fetch request results in a copy being input into DCAR and the original remaining in the fetch queue. In the next clock cycle, the address of the fetch request located in the DCAR is compared against the address of all store queue entries with an active SQmark in the fetch request's field. This is done to ensure that a fetch from a location that was stored to by a prior store instruction will obtain the data generated by that store instruction.

As seen in FIG. 1, this address comparison is performed by comparators $C_1$-$C_n$. The address of the DCAR entry is compared with the address of each store queue entry with an active mark in the SQmark of the DCAR entry. If these addresses are equivalent in any of the comparisons, the comparator outputs a signal which sets the pending bit (SP) in the pending fetch request located in the fetch queue. A set pending bit indicates that that fetch request is "interlocked" with one or more store requests, and therefore, its execution must be performed in instruction sequence. Also, when there is a match of addresses, a cancel signal is sent to the memory unit to cancel the fetch request pending. The pending fetch request remains in the fetch queue and the fetch queue halts the draining of requests.

The store queue then begins to drain its store requests. As each store request is gated to DCAR and out to the memory unit, the mark associated with that store request in the pending fetch request's SQmark field is reset. This indicates that that store request which had arrived at the buffer prior to the pending fetch request has been executed. When all entries in the pending fetch request's SQmark field have been cleared (i.e. its value is 0), the fetch queue regains priority and restarts delivery of the fetch request to the memory unit, while the draining of the store queue is held up. The pending fetch request in the fetch queue is gated into DCAR and, once again, because the request resident in DCAR is a fetch request, a comparison is made of the address in the DCAR with all the addresses of store queue entries in the SQmark field. However, the SQmark field of the fetch request is clear, and so, no buffer store requests are prior to the fetch request, and it is allowed to proceed to the memory unit for execution.

Another aspect of the present invention is the interrupt handling capability of the fetch and store buffer. When a storage request is entered into the DCAR and sent out to the memory unit for execution, the address of the request is stored in the Pending Data Address Register (PDAR). This address remains there until the memory unit has verified whether the pending request causes an interrupt. The interrupt checking operation should be completed in the same cycle that the address is in the PDAR.

If an interrupt is detected, the execution unit will not send any more requests to the queues. For example, if there is a Translation Lookaside Buffer miss, the execution unit will wait for the translation lookaside buffer to be loaded and for the address to be translated before resuming requests. During this time, the address that may cause the interrupt remains in the PDAR. Additionally, the execution unit gates important information about the storage request causing the detected interrupt into the Pending Data Storage Interrupt Status Register (PDSISR) to be utilized by the interrupt handling software. This status information includes items such as the kind of interrupt detected and whether the associated request was a load or store.

If the instruction that causes the interrupt is a store, the execution unit will hold off all requests and wait for the instruction sequencing logic to acknowledge the interrupt. If the instruction that causes the interrupt is a load, the execution unit holds off all fetch requests to the memory unit, but will continue to transmit store requests located in the store queue which are older than the fetch request causing the interrupt. This is accomplished by draining all store queue entries marked in the SQmark field of the interrupt tagged request. As each store queue entry is drained, its mark in the SQmark field is reset. If during this draining a store request being processed for the store queue causes an interrupt in the memory unit, then that store request entry overlays the pending entry in the PDAR, as it is the oldest request that causes the interrupt.

Eventually the instruction sequencing logic will either cancel the instruction stream or complete the instruction that causes the interrupt. When it completes the instruction that causes the interrupt, it commands the execution unit to move the address and status information in the PDAR and PDSISR to the non-volatile registers of the Data Address Register (DAR) and Data Storage Interrupt Status Register (DSISR), respectively. This ensures precise interrupt capability for the interrupt handling software.

If instead, the execution unit detects an interrupt, it tags the request associated with the interrupt using the FI bit. When this request is sent to the memory unit, the memory unit detects the FI bit and reports the interrupt to the instruction sequencing control. The procedure then proceeds in an identical manner as with the memory unit detected interrupt as described above.

Figure 2:
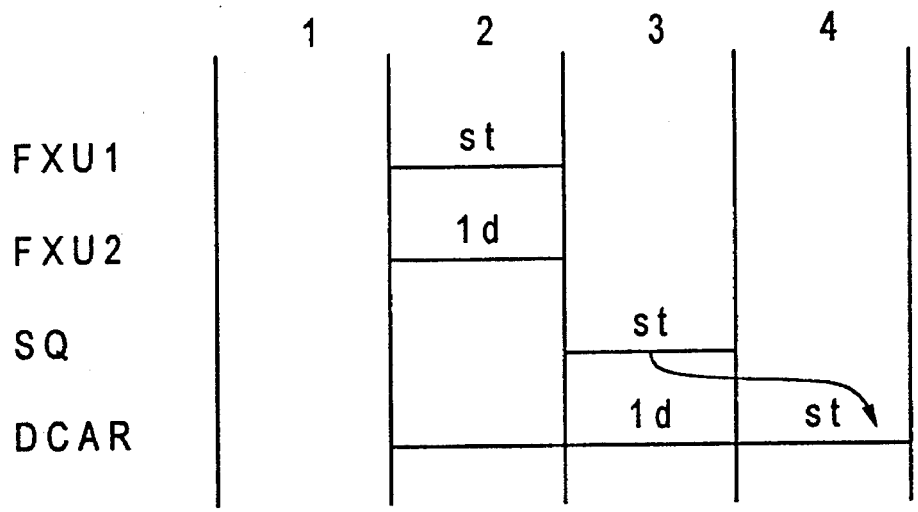
FIG. 2 is a flow sequence of a particular example of the operation of the buffer of the present invention.

Referring now to FIG. 2, there is depicted a flow sequence of a particular example of a fetch and a store execution in the buffer of the present invention. This example shows a simple situation where the instruction sequence issues a store request before a load request, but the load is executed ahead of the store. In FIG. 2, each column represents a clock cycle in the operation of the buffer. During the second clock cycle 2, the store request is issued by FXU1 and the load request is issued by FXU2. During the third clock cycle 3, the store request is loaded into the store queue SQ, and the load request is gated into DCAR and sent to the memory unit. Since no interrupt was associated with the load request, the request was executed by the memory unit. In the fourth clock cycle, the store request is drained from the store queue into DCAR, and sent out to the memory unit for execution.

Figure 3:
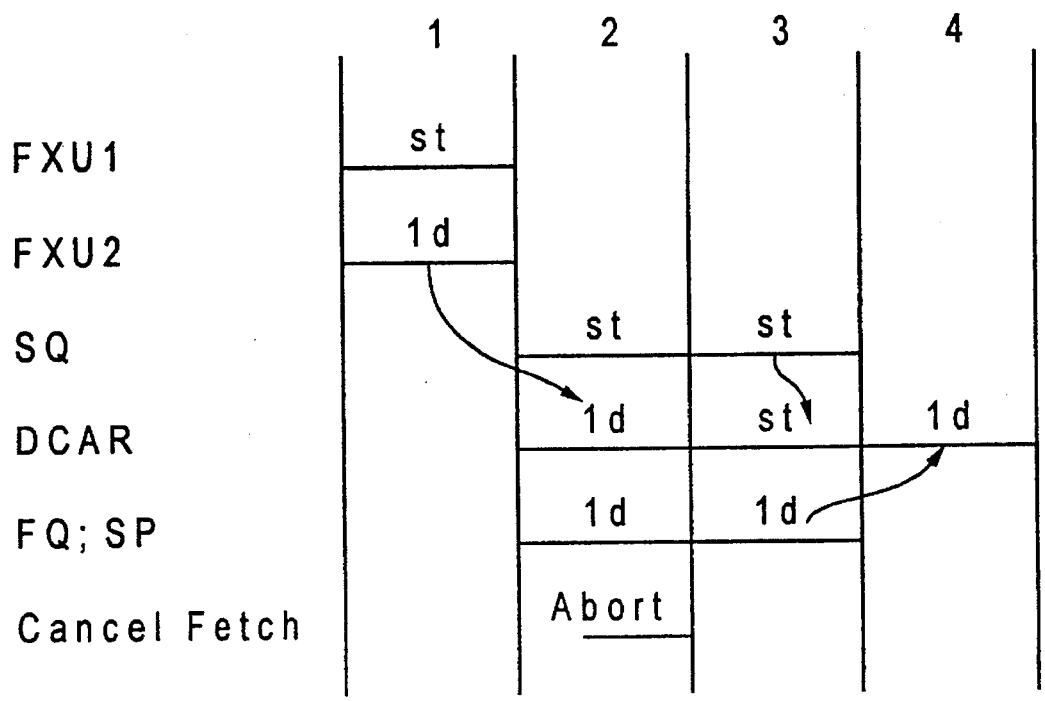
FIG. 3 is a flow sequence of a particular example of the operation of the buffer of the present invention.

Referring now to FIG. 3, there is depicted a flow diagram of the requests in the buffer of the present invention in the situation where a load request interlocks to a store request. During the first clock cycle, FXU1 issued a store request and FXU2 issued a load request to the buffer, although the instruction sequence placed the store request before the load. During the second clock cycle, the store request is loaded into the store queue and the load request is gated directly into DCAR. However, a comparison of the address of the load with the address of the store indicated that they were interlocked (i.e. the load was to the same memory address as the store). Therefore, to maintain process integrity, an abort command was sent to the memory unit to cancel the fetch request. During the same cycle, the store pending bit, here indicated by FQ SP, is set in the load request entry in the fetch queue. The load request remains in the fetch queue during the third cycle, while the store request is transferred from the store queue into DCAR and sent to the memory unit and executed. In the fourth cycle, the load request is transferred from the fetch queue into DCAR and the memory unit for execution. This example shows how the buffer of the present invention prevents out of order execution of interlocked requests.

Figure 4:
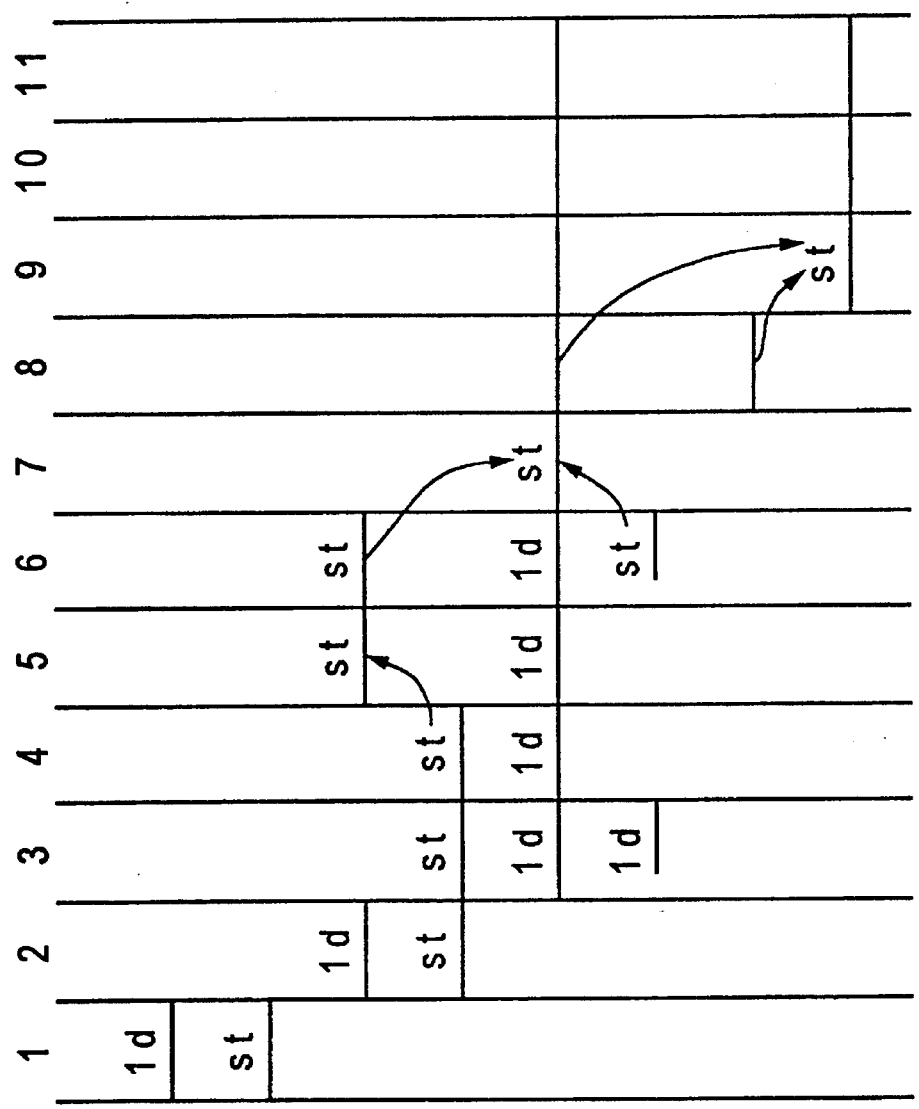
FIG. 4 is a flow sequence of a particular example of the operation of the buffer of the present invention.

Referring now to FIG. 4, there is depicted a flow diagram showing an example where a store interrupt occurs after a load interrupt in the buffer of the present invention. Once again, the original instruction sequence places the store request before the load. The FXU1 issued the load request to the buffer, and FXU2 issued the store request. The initial action provides the load request priority, and then transfers it directly into DCAR. The store request is loaded into the store queue to await execution. During the third cycle, the memory unit notes that there is an interrupt associated with the load request, and announces the exception to the FXUs. Because of the memory unit exception, the store request remains in the store queue during the next cycle.

During the fourth cycle, the SQmark of the pending load request is checked to determine which store requests are older than the load request. The FXU will allow all older store requests in the store queue to be made to the memory unit. In this example, the instruction sequence placed the store request prior to the load request, and so the store entry will be marked in the SQmark field of the load request. Therefore, the store request is gated into DCAR, as seen in cycle 5. In cycle 6, the memory unit notes an exception associated with the store. This will force the store request to be written into PDAR/PDSISR, overwriting the interrupt tagged load request, as seen in cycle 7. In the next cycle, the instruction sequencing logic has completed the instruction that caused the interrupt, and the FXU moves the address and status information into the DAR/DSISR for use by the interrupt routine.

In summary, the present invention provides a fetch and store buffer which supports out of order execution of storage requests. This buffer provides better system performance by allowing more instruction throughput. The fetch and store queues allow the address generation of load and store instructions to proceed as soon as all resources needed to generate the address are available. Requests are then dispatched as soon as they are ready for execution, rather than waiting for sequential order. However, out of order execution of interlocked requests are prohibited, thereby, preventing logical incoherence of fetches and stores. Therefore, the buffer of the present invention improves performance by increasing the execution rate.

While the invention has been particularly shown and described with reference to a preferred embodiment, it will be understood by those skilled in the art that various changes in form and detail may be made therein without departing from the spirit and scope of the invention.

We claim:

1. A method for handling fetch and store requests in a data processing system, comprising the steps of:

(a) entering a store request into a store queue in response to receiving the store request from an execution unit;

(b) entering a fetch request into a fetch queue and setting one or more marks in a field associated with the fetch request, which indicate the store queue entries present at the time the fetch request is entered, in response to receiving the fetch request from an execution unit;

(c) draining any store queue entries out to a memory unit if the fetch queue is empty;

(d) if the fetch queue contains at least one entry, further performing the steps of:

(1) copying a copy of the fetch request in the fetch queue into a memory unit address register and sending the fetch request to the memory unit, when the memory unit is ready to accept a request, wherein the copied fetch request becomes the pending fetch request, (2) determining if the pending fetch request in the memory unit address register is addressed to the same memory location as any store queue entries marked in the pending request's field, (3) if the determination is negative, performing steps (d)(1) and (d)(2) on a next, if any, fetch request contained in the fetch queue, and (4) if the determination is affirmative, draining the store queue entries, marked in the pending fetch request's field, from the store queue to the memory, and then copying a second copy of the pending fetch request to the memory unit address register and sending the pending fetch request to the memory unit to be executed;

(e) loading status information associated with an interrupt tagged request into a pending data storage interrupt status register and copying the pending fetch request to a pending data address register; and (f) if an interrupt associated with a request is detected, setting a tag associated with the request indicating the interrupt; and (1) if an interrupt tagged request is a store, halting execution of all requests until the interrupt is acknowledged by instruction sequencing logic;

(2) if an interrupt tagged request is a fetch, draining all store queue entries marked in the interrupt tagged request's field from the store queue to the memory to be executed, while halting the draining of the fetch queue until the interrupt is acknowledged by the instruction sequencing logic.

2. A fetch and store buffer comprising:

a store queue for receiving store requests from an execution unit;

a fetch queue that receives fetch requests from an execution unit and which sets a mark in a field associated with each received fetch request indicating any store queue entries which are present at the time the fetch request is received and removing such mark from the field when the associated store queue entry is drained;

comparator means for determining if a received fetch request is addressed to the same memory location as any store queue entry marked in that fetch request's field;

a register;

a controller that copies a fetch request in the fetch queue into the register and drains the fetch request from the fetch queue out to the memory unit, when the memory unit is ready to accept a request, and further wherein the controller drains the store queue entries marked in the fetch request's field from the store queue prior to draining the fetch request when the comparator means determines that the fetch request is addressed to the same memory location as any store queue entry marked in that request's field wherein the controller will set a tag associated with a request indicating the interrupt if an interrupt associated with the request is detected, and further, if an interrupt tagged request is a store, the controller will halt execution of all requests until the interrupt is acknowledged by instruction sequencing logic, and still further, if an interrupt tagged request is a fetch, the controller will drain all store queue entries marked in the interrupt tagged request's field from the store queue to the memory unit to be executed, while halting the draining of the fetch queue until the interrupt is acknowledged by the instruction sequencing logic;

a pending data storage interrupt status register having status information about a pending interrupt tagged request; and a data storage interrupt status register having status information about a previous interrupt tagged request.

* * * * *